July 8, 1969 W. E. POLITZ 3,453,667

DRAIN VALVE CONNECTING MEANS

Filed Oct. 7, 1966

INVENTOR.
W. E. POLITZ
BY Robb&Robb
attorneys

United States Patent Office 3,453,667
Patented July 8, 1969

---

3,453,667
DRAIN VALVE CONNECTING MEANS
William E. Politz, Delphi, Ind., assignor to Stephen A.
Young, Monticello, Ind.
Filed Oct. 7, 1966, Ser. No. 585,112
Int. Cl. A47k 1/14
U.S. Cl. 4—295                                    4 Claims

ABSTRACT OF THE DISCLOSURE

This disclosure relates to what is known as a pop-up fitting in which the plunger portion thereof is arranged to be engaged with and disengaged from the operating ball rod usually supplied in such fittings, without any particular manipulation since the engaging portion of the plunger is resileint so as to embrace the ball rod readily and be removable therefrom equally readily, and yet have sufficient inter-engaging cooperation to permit the opening and closing of the plunger to permit the water to be drained from the sink or lavoratory and/or to be retained therein.

---

This invention relates to plumbing fittings, more particularly to drain fittings and specifically to those known as pop-up fittings.

In the pop-up drain fittings in which this invention finds its most advantageous use, it has been customary to provide the plunger associated with such fittings, with an eye at the lower end thereof adapted to engage positively with the ball rod which is arranged so as to operate in a pivotal manner and raise and lower said plunger. The reason for making a positive engagement has been to assure the shut-off of flow of water from a lavoratory or the like in which such fittings are customarily installed and yet make the same removable with some manipulation as by removal of the ball rod when such drain opening may become clogged or otherwise requires such removal.

There have additionally been devised in the prior art, certain connecting means which facilitate the connection of a plunger with a ball rod by rotating the plunger in a particular manner so as to bring a hook at the lower end of the plunger into connection with the ball rod, but again this possibly enables the removal or improper operation of the plunger because the plunger happens to rotate in a particular manner and thus become disengaged at the said hook from said ball rod previously mentioned.

With the foregoing in mind, the present invention is provided to overcome all of the problems attendant upon use of the prior art devices, and particularly the necessity to remove the ball rod from its position in the pop-up body to enable the removal or replacement of the said plunger, and in any event to provide an advantageous arrangement which will eliminate the necessity for a peculiar formation of the end of the plunger which may or may not always be operative.

The principal object of the present invention is therefore, to provide a pop-up construction in which the plunger is readily positioned in operative connection with the means for raising and lowering the plunger, and at the same time will provide positive operation to the extent necessary to open and shut the plunger to maintain fluid in or permit the draining of the lavoraory or the like in which the same is installed.

A further object of the invention is to provide a novel pop-up plunger which includes means for resiliently engaging a control means or part thereof so that positive actuation is provided and yet by exertion of a certain amount of lifting action, the plunger may be removed to facilitate cleaning of the opening or for other purposes.

Another object of the invention is to provide a novel plunger in which the lower end thereof is provided with means to frictionally engage and operate in conjunction with the ball rod ordinarily provided for raising and lowering the said plunger, effecting positive sealing of the top of the plunger in the seat provided and yet facilitate removal thereof when occasion demands.

Other and further objects of the invention will be understood from a consideration of the specification appended hereto and disclosed in the drawing wherein.

Figure 1:
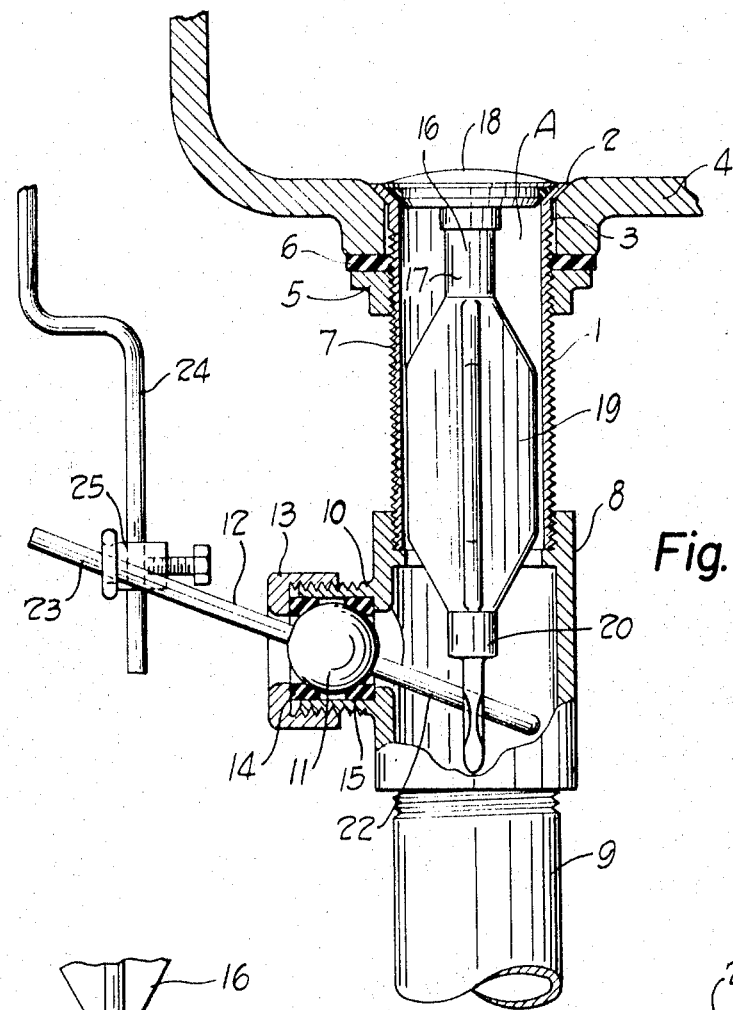
FIGURE 1 is a vertical sectional view, fragmentary in nature, disclosing the various parts of a pop-up unit in which the invention is incorporated.

Referring now to FIGURE 1, a pop-up drain unit is shown as comprising a body 1 at the upper end of which is provided a flared flange 2 adapted to be positioned in the drain opening 3 of a lavatory indicated at 4 and disclosed only partly, since the balance thereof may be of any form and is well known in the art.

In order to maintain the body 1 in position in the drain opening 3, a suitable lock nut 5 is provided, a washer 6 likewise being furnished to effect sealing, threads 7 on the exterior of the body 1 making possible manipulation of the lock nut 5 into the position disclosed.

At the lower end of the body 1, and threadedly engaged therewith, is provided a pop-up T 8 the interior of which being in alignment with the interior of the body 1, forms a continuation of the passage in the said body 1, the passage further extends through tailpiece 9 to any suitable drain.

The T 8 is provided with an offstanding section 10 in which is seated a ball 11 of a ball rod 12, maintained in position by a suitable cap 13 in which, threads for engagement with offstanding section 10 are provided and thus in conjunction with sealing members 14 and 15 makes possible manipulation of the ball rod 12 with the ball 11 as a center, to raise and lower a plunger generally designated 16 and operating in the passage in the body 1, the passage being designated A for the purposes hereof.

The plunger 16 is formed with a central stem 17, at the upper end of which is a top or head 18 there being suitable guides 19 extending outwardly from said stem 17.

The guides 19 facilitate smooth action of the plunger 16 as it is moved upwardly and downwardly in the passage A so as to bring the top 18 into sealing position on the flange 2 to prevent water from flowing outwardly from the lavatory 4.

Figure 3:
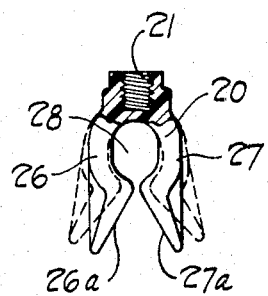
FIGURE 3 is a view showing the manner in which the means for connection of the plunger with the ball rod is operated to effect connection and disconnection and further to illustrate the manner of mounting the said means on the plunger.

At the lower end of the plunger 16, is the ball rod connection 20, which, as indicated in FIGURE 3, may be formed of a suitable plastic having the threaded portion 21 at the upper end thereof for engagement with a mating threaded portion on the lower end of the plunger 16.

The ball rod connection 20 provides the means for engaging and disengaging of the plunger 16 with the ball rod 12 and specifically the end 22 thereof, the other end 23 being arranged to engage with a lift rod 24 by means of a connection 25 so that the ball rod may be rotated around the ball 11 as an axis.

The ball rod connection 20 as seen in FIGURE 3, includes a pair of downwardly extending arms or members 26 and 27, which are formed so as to provide a central portion 28 adapted to surround the end 22 of the ball rod 12, the lower ends of the members 26 and 27 diverging as indicated and including surfaces 26a and 27a respectively, so that they will guide the rod 22 into connected relationship with the plunger 16 when manipulated for that purpose.

Figure 2:
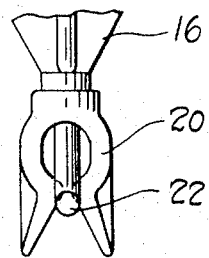
FIGURE 2 is a fragmentary view disclosing the means for connecting the plunger at the lower end thereof to the control means or ball rod for lifting and lowering the plunger.

It is explained that the connection 20 is formed of a plastic material preferably or of some resilient material which will facilitate the movement of the parts 26 and 27 into the dotted line positions disclosed in FIGURE 3 so that the rod 22 may slide into its position as indicated in FIGURES 1 and 2 by suitable pressure exerted on the head or top 18.

Since the members 26 and 27 are of suitably rigid nature under ordinary conditions to maintain the connection, the raising and lowering of the plunger will effect the sealing action necessary and yet when it is desired further to remove the plunger from its operative position, by manipulating the ball rod 12 into a position wherein the end or part 22 thereof is upward, the head 18 of the plunger 16 may be grasped and by raising further, cause the members 26 and 27 to move into the dotted line position and thus be disengaged from the part 22.

While the member 20 is shown as being a separable part connected by the threads 21 to suitable threads on the plunger 16, it is to be understood that the entire plunger may be made of the same material as the connection 20 if desirable or necessary so that the type of action heretofore described may be effected.

It will be understood that the movement of the plunger 16 upwardly and downwardly in response to corresponding manipulation of the lift rod 24 may be effected during the course of use of the pop-up for drain and liquid retention purposes.

I claim:
1. In a drain control fitting of the class described, in combination, a body having a drain passage therethrough, means to connect one end of the body at a drain opening in a sink or the like, a shut-off seat at said end, a T at the other end of the body, a drain passage in the T comprising a continuation of the passage in the body, a plunger operable in the body and having a top engageable with the seat aforesaid, control means having a part extending into the said passage to raise and lower the plunger to move the top toward and from the seat to control flow through the passage, and means on the plunger to be engaged with and disengaged from the part comprising resilient members arranged to separate during movement into position to embrace the part of the control means while said part remains in the passage.

2. A combination as claimed in claim 1, wherein the means on the plunger comprises a body having a central opening therein through which the part extends in operative position, said body being formed with a pair of arms having divergent end portions formed to separate and guide the means into said position with the arms embracing the said part.

3. A combination as claimed in claim 2, wherein the body is formed of resilient material and is removably engaged with the plunger aforesaid.

4. A combination as claimed in claim 1, wherein the plunger is formed of a material which is resilient to facilitate engagement and disengagement of the means with the part.

References Cited

UNITED STATES PATENTS

| 2,807,806 | 10/1957 | Watkins | 4—203 |
| 2,827,639 | 3/1958 | Schmidt | 4—203 |
| 3,353,192 | 11/1967 | Christiansen | 4—203 |

PATRICK D. LAWSON, *Primary Examiner.*